United States Patent [19]

Boyle et al.

[11] Patent Number: 5,623,541
[45] Date of Patent: Apr. 22, 1997

[54] APPARATUS TO MANIPULATE AND EXAMINE THE DATA STRUCTURE THAT SUPPORTS DIGIT ANALYSIS IN TELECOMMUNICATIONS CALL PROCESSING

[75] Inventors: Valerie Y. Boyle, Wheaton, Ill.; Daryl C. Lu, Freehold; George L. Sicherman, Ocean, both of N.J.; Robert A. Swanson, Naperville, Ill.

[73] Assignee: Lucent Technologies Inc., Murray Hill, N.J.

[21] Appl. No.: 344,438

[22] Filed: Feb. 17, 1995

[51] Int. Cl.⁶ .......................... H04M 15/00; H04M 3/42; H04M 7/00; H04J 3/24
[52] U.S. Cl. .......................... 379/136; 379/133; 379/112; 379/207; 379/220; 379/34; 340/825.02; 395/184.01; 370/256
[58] Field of Search .................. 379/111, 1, 112, 379/34, 113, 114, 115, 116, 117, 118, 119, 121, 136, 201, 207, 221, 220, 224, 230, 269; 370/94.1, 94.3, 62; 364/140, 146; 340/825.02, 825.03, 825.04; 395/183.01, 183.13, 183.15, 182.15, 183.22, 184.61, 187.69

[56] References Cited

U.S. PATENT DOCUMENTS

| | | | |
|---|---|---|---|
| 5,437 | 7/1848 | Lane | 340/825.03 |
| 5,136,690 | 8/1992 | Becker et al. | 379/136 X |
| 5,270,919 | 12/1993 | Blake et al. | 379/136 X |
| 5,311,584 | 5/1994 | Bogart et al. | 379/221 |
| 5,377,262 | 12/1994 | Bales et al. | 379/221 |
| 5,412,714 | 5/1995 | Bogart et al. | 379/221 |

Primary Examiner—Curtis Kuntz
Assistant Examiner—Paul Loomis

[57] ABSTRACT

An Operations Support System, comprised of a computer and workstation, stores digit analysis specifications for telecommunications call processing. A graphical user interface displays digit analysis specifications visually as subtrees made up of nodes representing the digits of the dialed number. Two subtrees can be displayed contemporaneously for evaluation and manipulation independently and from one to another. Operations performed on the nodes also operate on the embedded digit analysis specifications permitting manipulation of the specifications without the need to view or deal with the specifications themselves directly. Related information such as Routing Table Indexes and local exchange numbers called NXX numbers are displayed contemporaneous with display of a subtree of interest and are manipulated with regard to that subtree.

31 Claims, 13 Drawing Sheets

APPARATUS TO MANIPULATE AND EXAMINE THE DATA STRUCTURE THAT SUPPORTS DIGIT ANALYSIS IN TELECOMMUNICATIONS CALL PROCESSING

FIELD OF INVENTION

This invention relates to a means and method for providing a superior interface in a telecommunications system to easily visualize, display, manipulate and alter data structures for digit analysis by electronic telecommunications switches.

BACKGROUND OF THE INVENTION

"Stored Program" Electronic Switching Systems

Electromechanical switches, which set up calls by processing each digit as it is dialed, have largely been replaced by electronic switches, such as the 5ESS switch (5ESS is a registered trademark of AT&T Corp) available from AT&T Network Systems, 475 South Street, Morristown, N.J. Such electronic switches use "stored programs" to store a complete sequence of dialed digits, then to analyze it, and finally to switch the call. This invention concerns the administrative entry and manipulation of data which determines the call processing operation of the switch.

A call may be any transmission or broadcast, either connection-oriented or connectionless, carried by the telecommunications system, with or without a physical connection, regardless of content, whether voice, data, video or audio.

There are four major modules to call processing during call set up of a dialed or signaled telephone number: (i) origination—which determines what type of equipment is trying to initiate the call; (ii) digit analysis—which determines how to treat the call defined by the telephone number's dialed or signaled digits sequence; treatment can be routing, billing, storing, or any form of processing whatsoever; (iii) routing and charging—which physically switches the call and establishes how to bill it; and (iv) termination—which is signalling across the telecommunications system through intermediate trunks, switches and lines to the terminal equipment defined by the telephone number, alerting the terminal equipment to the incoming call and holding the line from pickup until disconnect. Call tear down is the disassembly of the call process.

Specifications for digit analysis are conveniently expressed as trees, with the first digit dialed being at the root, the possible second digits which can be dialed as the first level of branches from the root, the possible third digits which can dialed as the next level of branches extending from each possible second digit, and so forth. By convention, the root of the tree is shown at the top with the branches pointing downward.

Definition of Terms Within the Tree Allegory

Likewise, a "tree" is a term used commonly in computer science, and denotes a formal hierarchical structure on a collection of items. A tree is defined as a finite collection of elements called nodes, one of which is distinguished as a root, along with a lineage relation ("parent"; "child"), between pairs of nodes such that every node has just one parent except the root which has none. Suppose T1, T2, . . . , Tk are trees, and each tree is rooted at a node N1, N2, . . . , Nk, respectively. A root is the only node in a tree which does not have a parent. Coincidentally, a root may be a leaf if the tree consists of only a single node. A leaf is a node in a tree which has no children and therefore has no descendants of any kind. If the root has children, it is said to be a branch. Each root node N1, N2, . . . , Nk therefore is also either a branch or a leaf. We can construct a new tree Ti by making N be the parent of nodes N1, N2, . . . , Nk. In this tree, N is the root and T1, T2, . . . , Tk are either branches of the root or leaves. Nodes N1, N2, . . . , Nk are called the children of node N while N is the parent of nodes N1, N2, . . . , Nk. Assume that node N2 is followed by nodes N2i, N2ii, . . . , N2x. In such a case, node N2 is a branch and nodes N2i, N2ii, . . . , N2x are leaves, that is, there are no subsequent nodes following any of them. N is the grandparent of N2i, N2ii, . . . , N2x, which are conversely its grandchildren and N2 is the parent of N2i, N2ii, . . . , N2x, which are conversely its children.

Common practice is to draw a node as a geometric shape, such as a circle, with a label or value enclosed or to the side. The parent relation is depicted by drawing a line from the parent to each of its children. This line is usually called an "edge" or an "arc".

Trees Representing Digit Analysis Specifications

With ten potentially dialable digits, 1–9 and 0, and two symbols, * and #, a tree used to represent digit analysis data would most likely consist of denary nodes—each node having at most ten children—or duodenary nodes—each node having at most twelve children. A denary node can represent a point in a sequence of digits at which the next digit may be one of ten choices: 0,1,2, . . . , 9. A duodenary node is similar, but also permits the symbols * and # as potential children. Each branch base of the tree is a node, the root node, and at each node there are ten branches in a denary node tree. In a denary node forest, there are 10 trees, each with up to ten branches at every level and potentially as many branch levels as the number of digits that may be dialed in sequence in a numbering plan. For example, in the North American numbering plan, at most ten digits are permitted in a telephone number, the dialed forward number sequence, so digit analysis trees in a North American numbering system forest need no more than 10 levels of branches. In a duodenary node forest, there are 12 trees, each with up to twelve branches at every level and potentially as many branch levels as the number of digits that may be dialed in sequence in a numbering plan.

Digit analysis trees vary from switch to switch. Consider a local digit interpretation tree, referred to as an LDIT tree. While there are 10 types of LDIT trees, the LDIT trees in each switch's database have full foliage only for those phone numbers for which the switch is the serving switch, i.e., the switch routing the call along a line to the intended subscriber's destination terminal, because only a serving switch processes a call along a line to its served subscribers, and hence performs the digit analysis on the last four digits in the dialed telephone number sequence. Non-serving switches analyzing the same digits terminate in the designation of the switch which is the serving switch.

A Failure of Visual Representation to Match Mental Image

Although digit analysis specifications are most conveniently represented as a tree, the current state of the art in telecommunications systems is to represent digit analysis as a list of terminating paths in the tree. The conventional manifestation of a tree for presentation and manipulation of digit analysis specification data to a human administrator is in the form of a table of digits which bears no resemblance to a tree. Such tables lack any explicit representation of digit analysis data as a tree and contain no visual cues which show a linkage between nodes. Moreover, the administrator must add or delete node branches or leaves to or from trees by identifying each affected node individually, then making the change individually with numeric entry and add or delete commands. Changes to routing or charging must be made by accessing the routing or charging indexes maintained separately from the nodes.

Thus any changes made by a human administrator are both poorly reflected in the interface display and the method of implementing changes primitive, making the administrator's maintenance of digit analysis specifications unwieldy and slow.

There is therefore a need for a telecommunications interface that presents a visual representation more in keeping with the human administrator's mental image of the digit interpretation tree; that facilitates modifying the trees; that acts upon several types of trees while retaining clear visual representation of the tree; that constructs and manipulates large groups of trees, branches and leaves; that presents information embedded in the tree; and that presents information and data so that the administrator can easily use it.

Solution

The foregoing problems and needs are met by the present invention which provides in a telecommunications system an operation support system capable of pictorial representations of digit analysis specifications in the form of trees, that deals with call connection data embedded in the trees, that manipulates digit analysis specifications and call connection data through the manipulation of symbols to which the specifications and data are linked rather than by direct manipulation of the specifications and data sets themselves, that does in addition provide for direct manipulation of the specifications and data sets themselves, and that allows the manipulation of large groups of trees, branches and leaves rather than only individual nodes, to construct and manipulate the nodes and branches comprising each tree to add, modify and delete digit analysis specifications and call connection data sets for each switch served by the operations support system.

Four Forests of Digit Interpretation Trees Served

The instant invention recognizes that four forests of trees are involved in digit analysis.

The first forest is composed of Local Digit Interpretation Trees (LDITs). Assuming a denary dialing system, there are ten trees in the forest. LDITs provide the switch the capability of determining the line to be used to reach termination subscribers served by that switch, essentially focusing on the dialed digits which identify the subscriber's terminal equipment. In the North American dialing plan of 10 digits made up of a three digit NPA number, a three digit NXX number, and a four digit XXXX number, the last four digits dialed are the subscriber's terminal equipment number. Returning to the tree analogy, LDITs are full foliage trees within the serving switch since they deal with the last four digits dialed in a telephone number.

The second forest is composed of Preliminary Digit Interpretation Trees (PDITs). PDITs are used to strip off prefixes in a line origination call which have meaning to call processing—typically called 1+ dialing and 0+ dialing—handing the telephone number dialed forward to the appropriate LDIT along with a tag which identifies to the LDIT that the call is of a specific type, for example, a credit card call. PDITs are duodenary trees capable of recognizing the symbols "*" and "#" in addition to the ten digits found on a keypad and hence the forest contains twelve trees. A PDIT is used to trigger either analysis by an LDIT and a line origination by the local serving switch in the instance where the caller and the intended call recipient are served by the same local switch, or call forwarding along a trunk to another switch for further digit analysis and call processing.

The third forest is composed of Incoming Trunk Digit Interpretation Trees (INDITs). INDITs are used to strip off prefixes which have meaning for incoming trunk signaling, typically Feature Group B and D prefixes. INDITs pass the dialed in-pulsed digits to the LDIT to determine whether the call can be terminated through the local switch or must be sent on along a trunk to another switch. Among other things, the INDIT has a trunk table which helps it direct calls out from the switch by basically indicating whether there is a direct trunk to a specified switch or whether intermediate trunks and switches must be utilized.

The fourth forest is composed of Remaining Digit Interpretation Trees (RDITs) which analyze dialed digits for an embedded dial stream and which provide a linear approach to arriving at routing information. The RDIT forest is entered from an LDIT tree by a marker at a node indicating that the call should jump from the LDIT to a specified RDIT. If the RDIT is successful in determining call routing utilizing its linear approach, the call will be connected accordingly; if not, the call will jump back to the original LDIT and digit analysis for call completion will proceed according to the LDIT branches.

FIG. 1 conceptualizes the interaction of the four types of digit interpretation trees by which each switch either terminates a dialed call locally or decides that the dialed call is not in the served local area. If the dialed call is not in the served local area, the switch selects a trunk to the next best switch and tries to connect the call according to the trunk routing table, seizing the appropriate connecting trunk and pulsing out the call along the trunk to that next best switch.

Operations Support System—Switch Digit Interpretation Trees Supported by a Centralized Database In accordance with the present invention, a computer-based operations support system (OSS) supports digit interpretation trees stored both in the OSS itself as well as in each switch database served by the OSS. Maintaining digit interpretation trees on the OSS of the present invention permits saving space on the served switches for call processing, and by gathering data from many different switches, the OSS presents to an administrator a network view rather than the isolated view of a single switch and permits the use of more elaborate tools to support network operations.

The switch database is used for call processing while the OSS is used to administer the databases for the switches served. The reason for this is that the modern stored program switch has half of its behavior determined by stored software which is table driven—it contains tables that determine the behavior of the switch depending upon different circumstances. The switch database is this collection of tables.

"Recent Changes" is industry nomenclature for any change to any of the switch tables.

Operations Support System Attributes

According to the present invention, the OSS is comprised of a computer having a display monitor, a keyboard, a mouse, a central processing unit (CPU), memory, software which establishes a database in memory and other software which graphically displays information resident in the database on the monitor in a predetermined fashion and allows manipulation of that information through commands entered by the mouse.

The present invention utilizes a novel technique to display and manipulate a digit interpretation tree to dramatically improve comprehension and manipulation by the human administrator. A conventional practice, in the example of a denary tree, is to display the root node and each of its ten children joined to the root by an edge, and each of its hundred grandchildren joined to its ten children by edges, ten per child. In such a scheme it is nearly impossible to display the third level, because a thousand nodes are barely distinguishable on the same display screen.

In contrast, under the novel approach of the instant invention, user interaction becomes very easy by limiting the number of trees displayed and by limiting the display to the lineage from the root node to the node of interest along with its children, the node of interest and its lineage to the root displayed in a first row and the children of the node of interest displayed in a second row.

Our invention is implementable with existing technology and equipment and takes advantage of current digit analysis techniques and recognizes the existence of interrelated separate tables for various pieces of the call process such as routing and billing and the existence of Centrex service blocks in manipulating groups of information through the manipulation of associated symbols and in manipulating specific data through keyed input.

In accordance with one aspect of our invention, a telecommunications system is provided with an operations support system including a computer-based workstation and a centralized database which contains LDIT, PDIT, INDIT and RDIT specification trees for each served switch.

In accordance with another aspect of our invention, digit analysis specifications and call connection data are associated with symbols for nodes and branches comprising the specification trees, the symbols being displayed rather than the specifications and call connection data sets each represents.

In accordance with yet another aspect of our invention, an operations support system displays for a node of interest its lineage to the tree root and the node's existing and potential children, subsequently referred to as a subtree, utilizing edges to show existing paths and symbols such as circles, squares or triangles to denote different nodes and the nature of the node.

In accordance with still another aspect of our invention, the operations support system displays two subtrees at a time and allows the independent manipulation of either of the displayed trees independent of the other displayed tree.

In accordance with a further aspect of our invention, the manipulation of data is accomplished by command buttons, activated by a mouse.

In accordance with still further aspect of our invention, the proper manipulation of data is provided further assurance by memory buffers that store the most recent manipulation introduced in a call connection information set until the administrator is satisfied that the update is correct and only then updates the database at the command of the administrator.

In accordance with a yet further aspect of our invention, tabular information regarding NXX numbers and Routing Table Information is displayed adjacent the displayed subtrees for manipulation.

In accordance with another aspect of our invention, tabular information is manipulated by mouse movements and commands in conjunction with pull down windows, the last manipulation of the table stored in buffer memory until the administrator is satisfied with the manipulation then related back to a subtree and node on interest.

BRIEF DESCRIPTION OF THE DRAWINGS

In FIG. 12, the marked NXXs are shown by the shaded area in Mask NXX window 86 which would actually be displayed in reverse color contrast.

DETAILED DESCRIPTION

Figure 1:
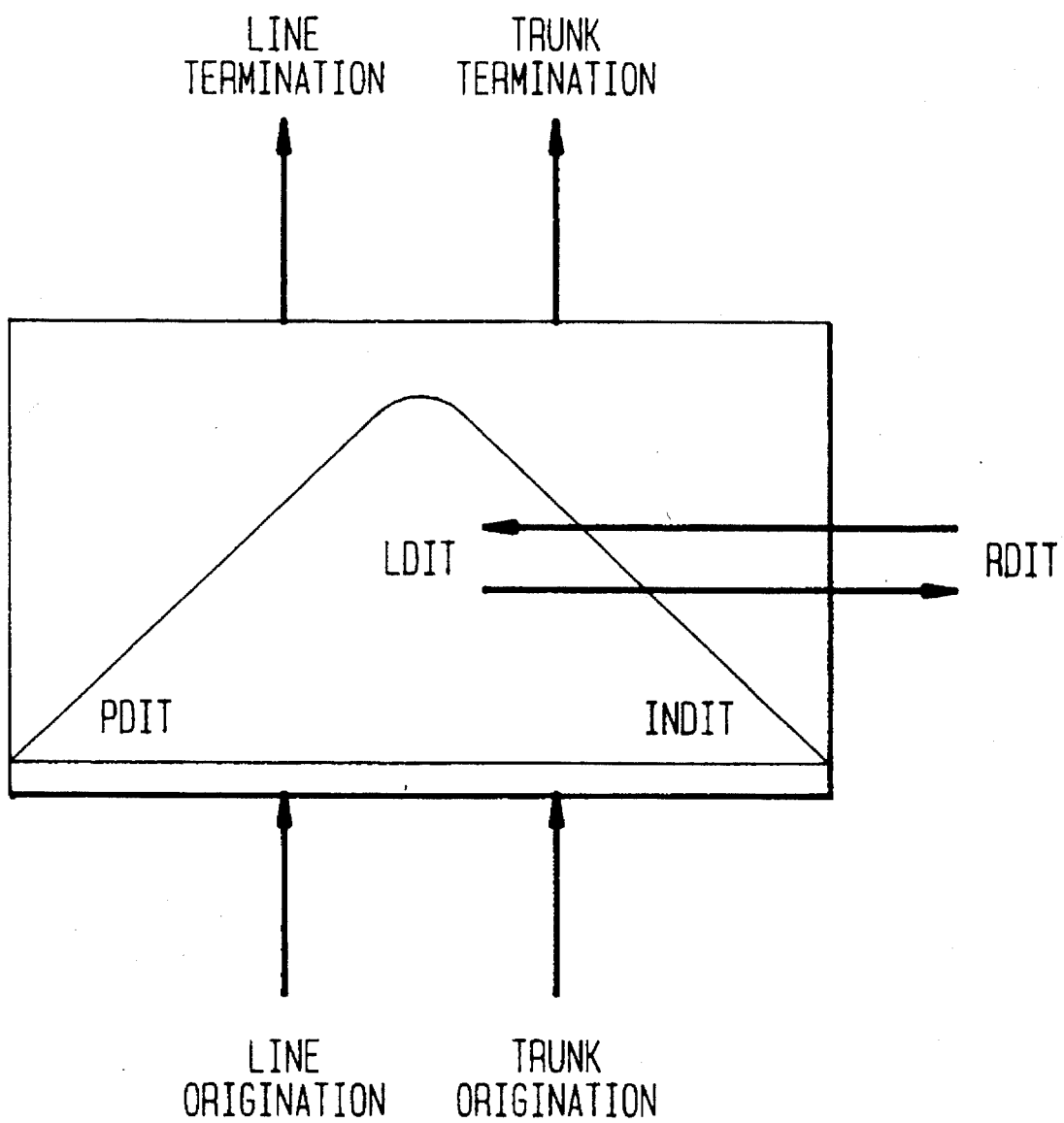
FIG. 1 conceptualizes the interaction of the four types of digit interpretation trees.
Figure 2:
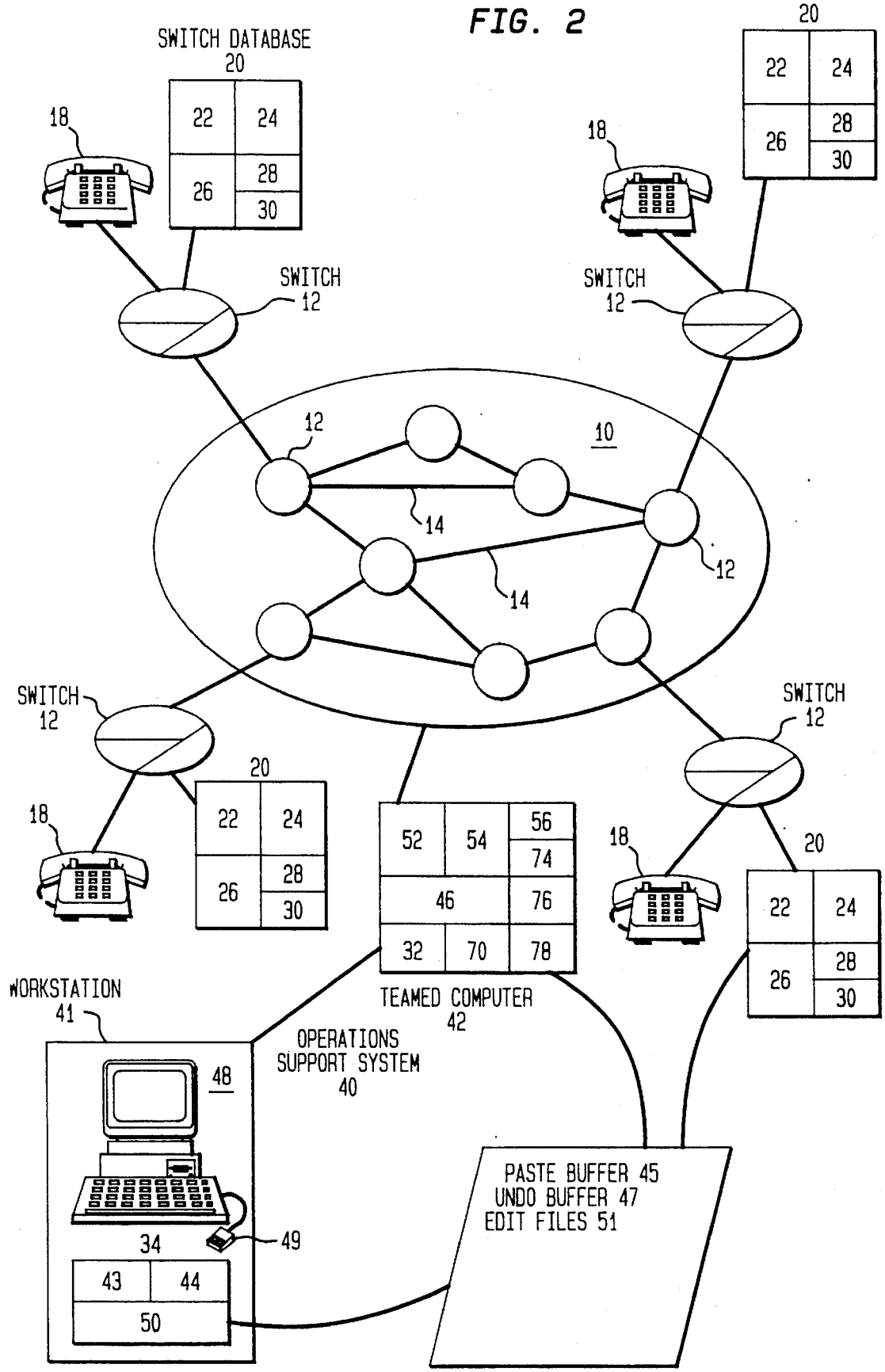
FIG. 2 illustrates a schematic of the instant invention as part of a telecommunications network.

FIG. 2 is a diagram illustrating the present invention as part of a telecommunications network. The telecommunications system 10 is composed of numerous trunks 14 connecting switches 12 one to another and lines 16 connecting switches 12 to their respective subscribers' terminal equipment 18. Each stored program electronic switch 12 in the network has associated with it a database 20 containing LDIT 22, RDIT 24, PDIT 26 and INDIT 28 specification trees relevant to the switch within the context of its location in the network and the terminal equipment it serves. The data comprising the trees are stored in various tables 30 within the database 20. Each leaf on an LDIT specification tree 22 represents an individual number served by a switch or a distinct group of numbers served by the switch, such as a Centrex block of numbers. The data determining the various features, routing, billing, and other attributes of each leaf comprise a call connection data set 32 for that associated number or block of numbers.

EQUIPMENT

As shown in FIG. 2, within the telecommunications system 10 is an operations support system (OSS) 40 of the instant invention comprised of a workstation 41 and teamed computer 42 modified with suitable programming and hardware interfaces to perform the functions required by the present invention. Workstation 41 is a workstation from Sun Microsystems, 2550 Garcia Avenue, Mountain View, Calif. 94043, or equivalent, which is a client server processor capable of supporting server workstations. Workstation 41 includes central processing unit 43, memory 44, display monitor 48, mouse 49 and its associated command software, a graphical user interface 50 developed using "X lib Intrinsics", a software tool set that is supplied as part of the Sun OS or Solaris OS operating systems available from Sun Microsystems, which creates the screen displays subsequently discussed, the paste buffer 45, Undo buffer 47, and edit files 51, and the windows through which commands can be entered and data manipulated. Teamed computer 42 is an HP 9000 super mini computer available from Hewlett Packard, 19111 Pruneridge Avenue, Menol Park, Calif. 94025 or equivalent. Teamed computer 42 includes a central processing unit (CPU) 54 and memory 54 having sufficient processing and storage capacity to store, retrieve and process data in resident databases 52 comprising call connection data sets 32 for the served switches 12. Database software 46, is in the preferred embodiment Informix Database Software available from Informix Software Inc., 4100 Bohannon Avenue, Menlo Park, Calif. 94025, and is resident on teamed computer 42.

The teamed computer 42 has resident in database(s) 52 the digit analysis specifications 70 making up the LDIT, RDIT, PDIT and INDIT trees for each of the switches 12 the OSS 40 is to maintain. The data making up the specifications 70 are kept in a form consistent with the tables resident in the served switch databases 20. The digit analysis specifications 70 ultimately represent the call connection data sets 32 for each leaf for each tree. In certain instances, types of data are kept in tables 72, also referred to as indexes. Examples of tabular data are the data forming the routing index 74, the charging index 76 and the coding index 78. Each piece of information in the each table is cross-indexed to the respective call connection data set(s) 32 and hence the digit analysis trees of which they form a part.

DISPLAY AND COMMAND

Figure 3:
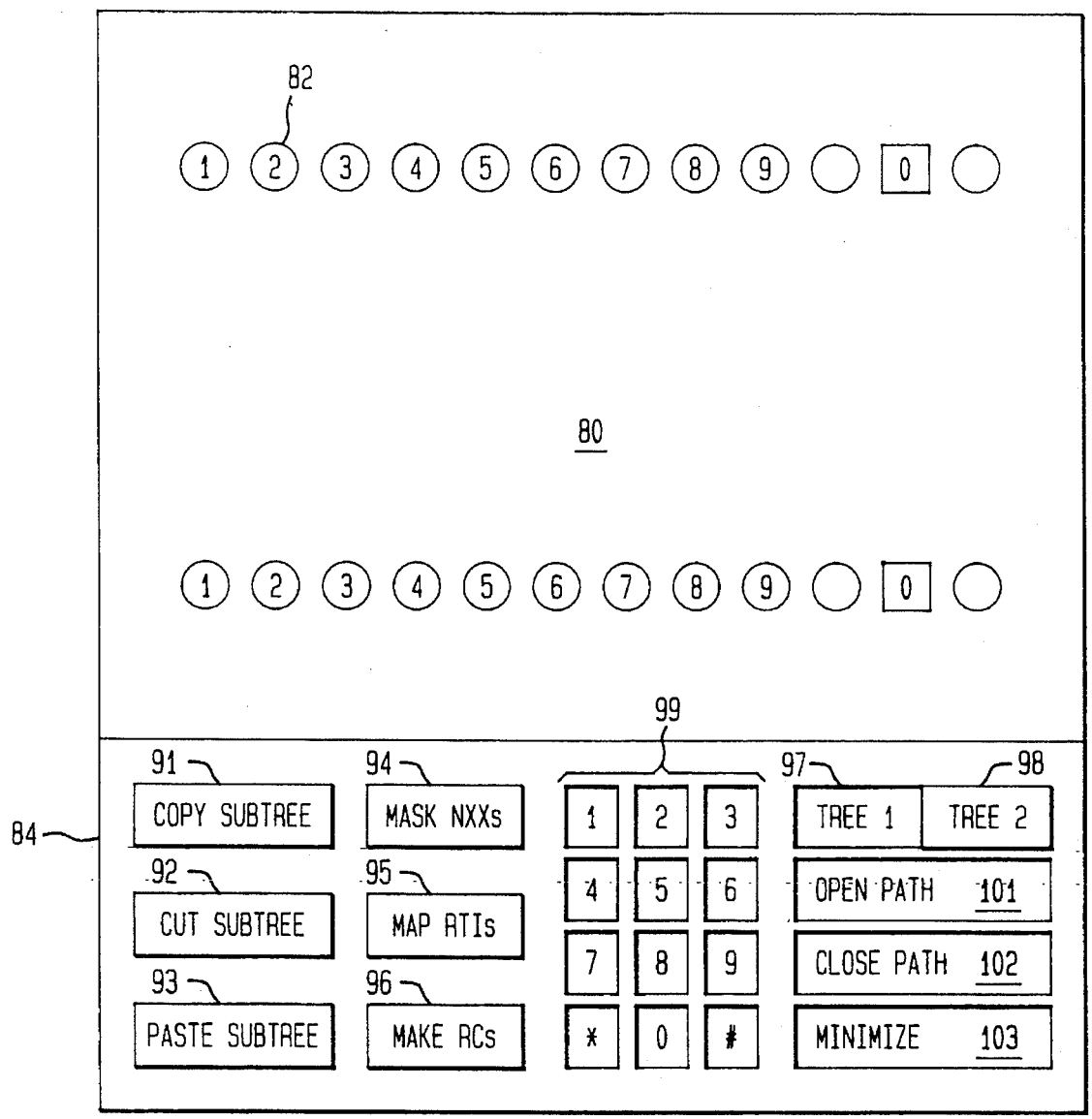
FIG. 3 illustrates a screen display of the instant invention at the time of commencing use.

Referring to FIGS. 2 and 3, the display and command features of the instant invention will be described. At the time of commencing use of the OSS 40, the administrator is required to provide verification authorization typical to UNIX-controlled password log-in and accesses the graphical user interface software (GUI) 50 from either the log-in prompt of through any UNIX window. As mentioned, the GUI 50 provides data retrieval, allocates storage in the workstation memory 44, provides display and manipulation to the administrator through monitor 48, and updates the database memory 44 on the teamed computer 42 and the databases 20 of the switches 12 served by the OSS 40. As shown in FIG. 3, at the time of initial log-in, the GUI 50 displays on monitor 48 a tree window 80 in which two rows of ten circles appear. Each row represents the second row of what will develop as the visual representation of a subtree under consideration by the administrator. Each circle 82 represents the root of one of ten digit analysis trees. In the initial display, all ten circles on both rows are uncolored or blank and are referred to as "ghost" circles because the administrator has not yet selected one of them.

Beneath tree window 80 is command window 84 in which appear the command buttons by which the administrator directs the GUI 50 through use of mouse 49. The OSS 40 adopts conventional mouse commands through left and center mouse buttons, not shown. The command window 84 contains the following command buttons which will subsequently be discussed: Copy Subtree 91, Cut Subtree 92, Paste Subtree 93, Mask NXXs 94, Map RTIs 95, Make RCs 96, keypad 99 having digits 0–9 and symbols "*" and "#", Tree 1 97, Tree 2 98, Open Path 101, Close Path 102, and Minimize 103.

Figure 4:
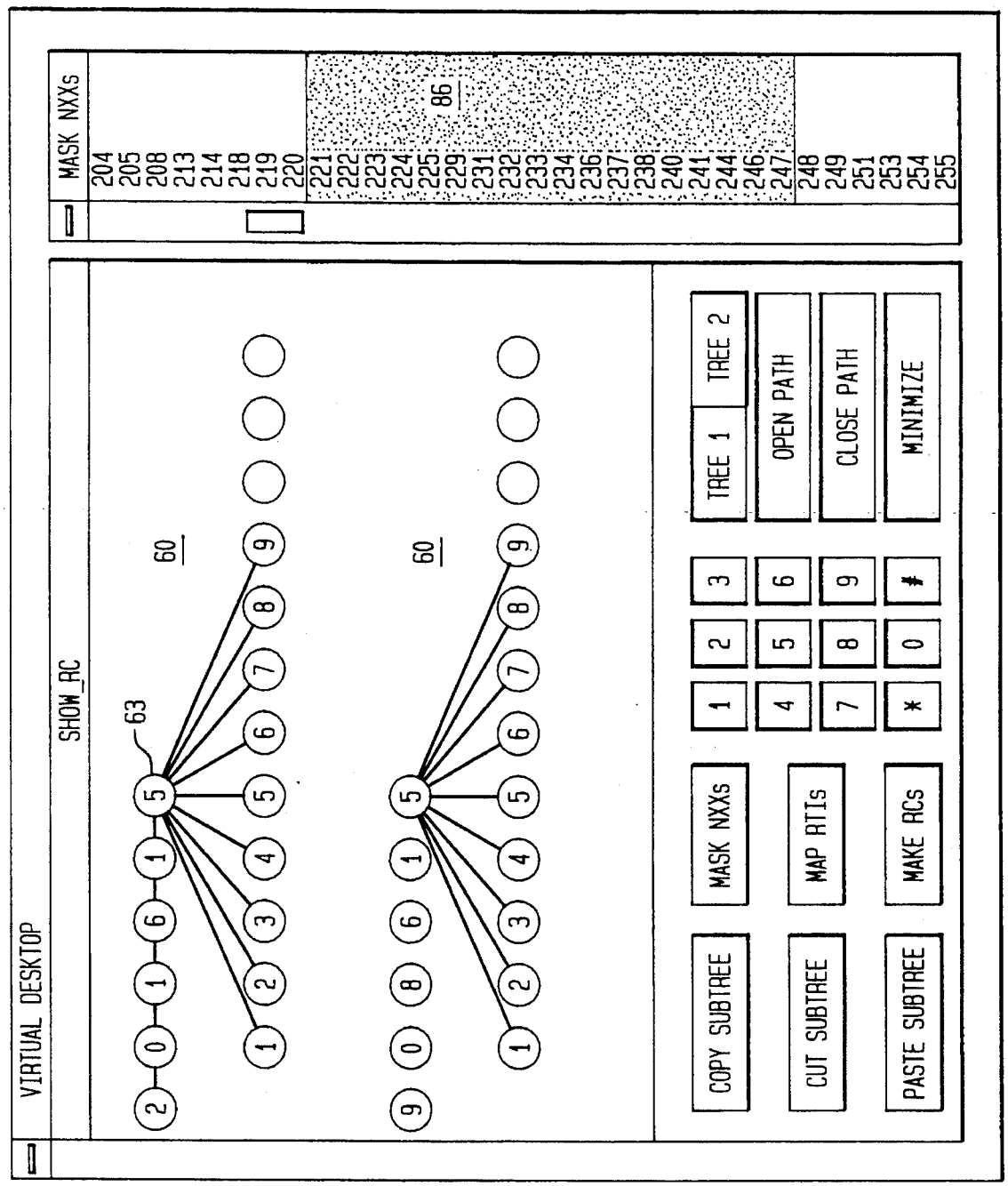
FIG. 4 illustrates a screen display of the instant invention showing the side bar window which displays all NXX numbers for the subtree then stored in the paste buffer and permits editing of the NXX numbers.
Figure 5:
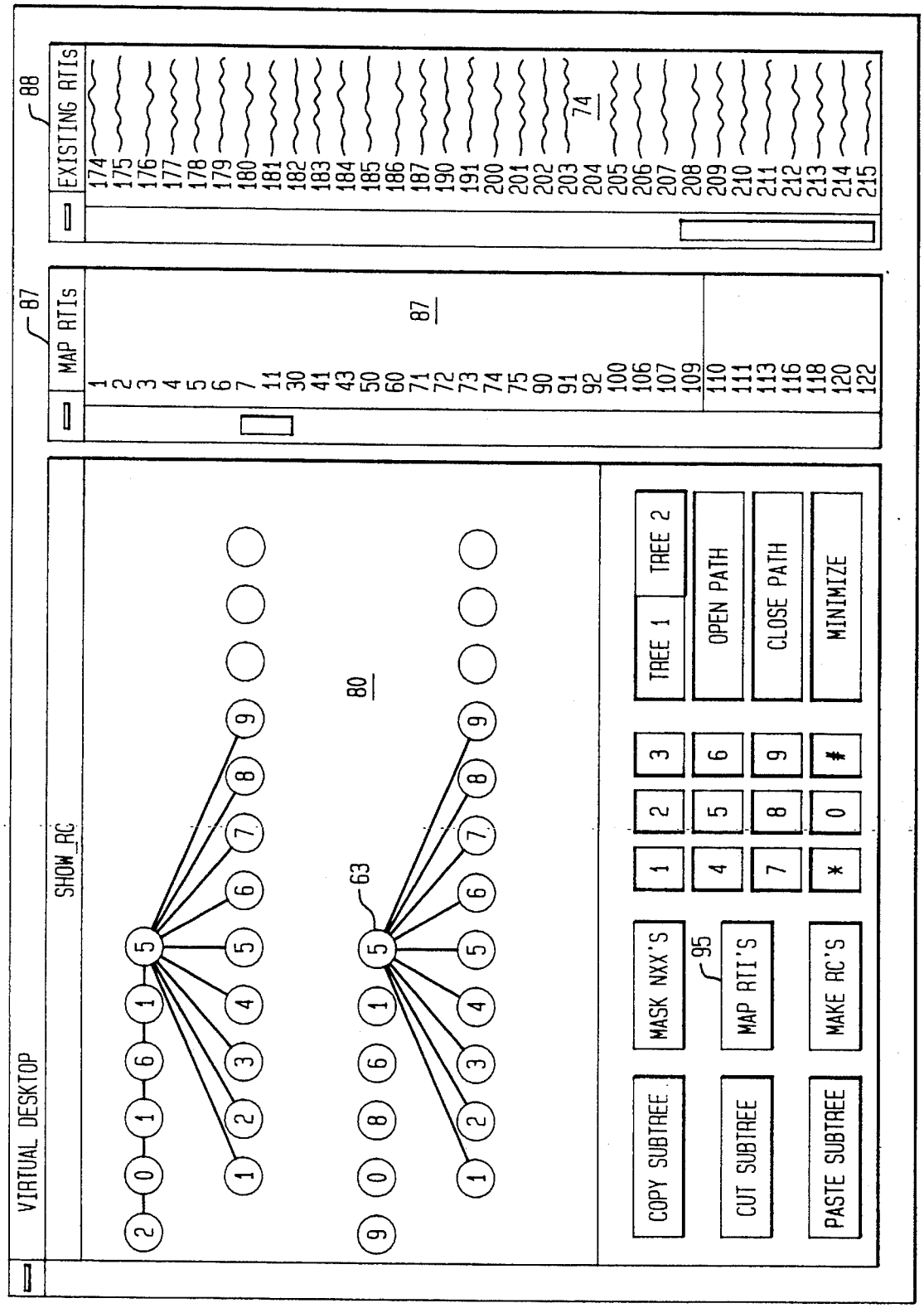
FIG. 5 illustrates a screen display of the instant invention in which a leaf, the number 513-293-8426, is to be added to the subtree 513-293-842_.

Referring to FIG. 4, the draw area of display monitor 48 displays up to two selected subtrees 60 from the perspective of a node 62 of interest. Depending upon the maintenance activity, display of a single subtree 60 is adequate for accomplishment of the desired manipulation. In other maintenance activities, two subtrees 60 may be displayed, for example, for manipulation of both subtrees by the administrator, reference to another subtree as an administrator manipulates a subtree, or for copying of a displayed subtree in whole or in part to another displayed subtree. The two selected subtrees may be in the same tree, or in different trees, in trees on the same switch, or in trees on different switches. Each subtree 60 is presented in the tree window 80 on two lines. As shown in FIG. 5, on the upper first line, the circle representing the node of interest, referred to as the Current Node 63, is displayed as the far right node in a chain of circles connected by edges, the chain identifying the ancestry of the node, each circle to the left representing the immediately preceding number in the identified dialed digit sequence (the lineage path). Beneath the lineage path on the second row are displayed all children for which the Current Node 63 is the parent. In a denary system this would consist of 10 symbols and in a duodenary system, this would consist of 12 symbols. Note that the present invention presents both existing and potential or "ghost" nodes as children, that is, both nodes which are in existence and nodes which can be brought into existence by the OSS 40. Each child is identified by its relevant integer, 0,1,2, . . . , 9, or symbol, * and #.

While not essential to the practice of the preferred embodiment, rather than representing each child as a circle, a different symbol can be used to indicate the nature of a node 62. For example, in the preferred embodiment, a terminating node or leaf, an example of which is the last digit of a phone number, is represented by a square while a branching node, one which has subsequent following nodes, is represented by a triangle to more graphically present to the human administrator a display in keeping with his/her mental image of a tree comprised of further branches or terminating in leaves.

To increase the facility for the human administrator to easily command the OSS 40, the GUI 50 provides a command window 84 on the display screen of monitor 48, containing the buttons described above, controlled by mouse 49 rather than entry of commands through a keyboard. The instant invention follows accepted conventions for "point and click" operations as will be subsequently discussed. Commands do not need to be translated into keystrokes and no purpose-built equipment need be provided to initiate the commands.

NAVIGATION

Referring to FIGS. 2–4, the following commands are utilized in operating the OSS 40. "Tree 1" and "Tree 2" buttons, 97 and 98 respectively. These buttons respectively activate the upper subtree and lower subtree display appearing in tree window 80. The mouse 49 is used to point and click on any node 62 in the active display which becomes the Current Node 63. The symbols and lines in rows one and two of each subtree display are adjusted to represent the change. As mentioned above, row one represents the path from the root of the tree to the new Current Node 63, and row 2 represents the children of the new Current Node 63. Note that this implies that it is possible to navigate any number of levels up the tree toward the root using the mouse 49, but only one level down in one point and click operation away from the subtree root. The mouse point and click commands are not enabled for any node in the inactive display. The inactive display continues to show the final node selected the last time the display was active as the Current Node 63 for that subtree.

CUT AND PASTE

Referring to FIGS. 2–4, a paste buffer 45 supports copying of the active subtree Current Node 63 and all its descendants as a way of transferring digit analysis data for the node and its descendants to another node. The administrator uses the mouse 49 to point and click on the Tree 1 or Tree 2 button, 97 and 98 respectively, to activate the subtree. Mouse 49 is used to point and click on the desired node in the active subtree to select the node as the Current Node 63, then the mouse is moved to point and click on the Copy Subtree button 91. When the button is released, a copy of the digit analysis specification data associated not only with the Current Node 63 but also with the branches and nodes its descendants is created in the paste buffer 45. Application of the Copy Subtree button 91 will overwrite any previous contents of the paste buffer 45.

To transfer the digit analysis specification data residing in the paste buffer 45 is accomplished by the administrator selecting the desired subtree by pointing and clicking on the Tree 1 or Tree 2 button, 97 and 98 respectively; then pointing and clicking on a node of interest to activate it as the Current Node 63 if it is not already selected as such in the active display. The administrator then points and clicks on the Paste Subtree button 93.

Thus, to transfer a group of digit analysis specification data, the administrator need not deal with each node individually, nor input all data individually if comparable data already exists for another node. The administrator is able to copy all digit analysis specification data not only for one node but for all the descendants of that node by identifying the node desired as the starting point and performing the above described operations. Any existing descendants of the Current Node 63 which are not explicitly overwritten by corresponding descendants for the node in the paste buffer 45 are left as is. Therefore, if complete replacement of a subtree is desired, it is necessary to delete the existing subtree before attempting a paste.

Application of the Cut Subtree button 92 will copy from the active subtree the Current Node 63 and all its descendants into the paste buffer 45. This results in the corresponding digit analysis specification data from the node down to be deleted from active memory and replaced by a leaf directed to a "no connection" response activity. Application of the Cut Subtree button 92 will overwrite any previous contents of the paste buffer 45. The previous configuration of the subtree rooted at the Current Node 63 can be recovered through an "Undo" command.

UNDO STACK

Referring to FIGS. 2–4, two buffers support an Undo operation. One is the paste buffer 45 and the other is an Undo Buffer 37. The Undo Buffer 37 contains an exact copy of the active tree before the last constructive or destructive operation by the administrator and a pointer 35 which identifies the Current Node 63 at the time before the last constructive or destructive operation by the administrator. Only the most recent operation can be undone. The "undo" command is selected by clicking the middle button, not shown, of the mouse 49 causing a window menu 64 to appear from which the administrator selects the "undo" command by pointing and clicking with the left button, not shown, of mouse 49. Activation of the command will cause a swap of the contents of the Undo Buffer 37 with the subtree identified by the undo pointer 35. If the current display shows an existing node in the restored tree, it remains as is. Otherwise, a display of the root node of the restored tree will become the new current display.

DELETING EXCHANGES

As shown in FIG. 4, a sidebar display window, the Mask NXXs window 86, is brought up adjacent the right side of the tree window 80 by pointing and clicking the mouse 49 on the "Mask NXXs" button 94 which retrieves from the paste buffer 45 all NXXs for the subtree then stored in the paste buffer 45 and displays them in the Mask NXXs window 86 as a listing of NXX numbers in numerical order. The mouse 49 is used to delete a sequence of NXXs by clicking the left mouse button to get into edit mode, then again depressing the left mouse button and holding it depressed while dragging the mouse down along the sequence until the last number of the sequence is reached. The sequence to be deleted from the mask will appear in a reversed screen band in the Mask NXXs window 86. By clicking the middle button, not shown, of mouse 49, a pop-up menu 64 appears which includes a "Cut" option. The left mouse button is clicked on the "Cut" option which will delete the marked sequence of numbers from the mask.

DATA EMBEDDED IN THE TREE

Along the branches of a digit analysis specification tree are embedded referrals to various tables 72 pertinent to call set up, including a routing index 74, a coding index 76, and a charge index 78. Each index refers to a table of associated data relevant to the index topic which is part of the digit analysis specification data in teamed computer database memory 44 and in each served switch database 20. All the different parameters produced by accessing the data in each index consistent with the embedded referral in the tree comprises the call connection data set 32 for the dialed sequence. While in the preferred embodiment, only the routing table index 74 is displayed and manipulated, the technique and approach has application to all other indexes or tables relevant to the call process. Notably, charge index 78 can be accessed and modified by the instant invention by defining to the GUI 50 its location in database memory 44 so that it can be retrieved, defining commands associated with one or more command buttons to manipulate the data, and providing appropriate command and display information to the GUI 50 to properly display the symbols or information in a desired format for the charging data retrieved and to properly act on the charging data through activation of command buttons associated with the displayed symbols and information. Subsequent discussion of the manipulation of routing index information encompasses similar operations with charge indexes and other tables relevant to the call process using the instant invention.

As shown in FIG. 5, activating the "Map RTIs" button 95 by pointing and clicking mouse 49 causes two bar windows to appear adjacent the right side of the Tree Window 80. The closer window is the "Map RTIs" Window 87 and farther window is the "Existing RTIs" Window 88. Existing RTIs Window 88 displays in numerical sequence the various routing paths, i.e., the call connection data set 32, embedded in the subtree then stored in the paste buffer 45.

Blocks of RTIs can be assigned by pointing and dragging the mouse 49 down along the Existing RTIs list, highlighting sequences of RTI's by reverse screen displays then clicking the mouse middle button, not shown, causing a pop-up window, not shown, to appear from which the "copy" command is selected. The administrator then moves the mouse 49 into the Map RTIs window 87 to the first RTI reference location in which the sequence is to commence for the subtree under consideration and selects a paste operation by clicking the mouse middle button, not shown to again cause a pop-up window, not shown, to appear from which the "paste" command is selected. Activation of the paste command by point and click causes the data to be transferred into the native editor.

No more than one existing RTI can be assigned to any reference location on the subtree of interest. However, the same RTI can appear at more than one reference location on the subtree of interest.

QUICK CLIMBING

Referring to the command window 84 in FIG. 3, the "Open Path" button 101 and the "Close Path" button 102 are related to the key pad 99 which allows manual entry of new nodes to the active tree displayed in tree window 80. Key pad 99 is made up of buttons numbered 0–9 and the symbols "#" and "*", each of which can be separately selected by pointing and clicking mouse 49. By activating the Open Path button 101, cruising down the tree by key pad 99 entries, then activating the Close Path button 102 as the node of interest is reached, the OSS 40 will assign a default call connection data set 32 to that node of interest. Selection of the Close Path button 102 also triggers display of the Existing RTI window 88 and through point and click of the mouse 49 on a desired RTI, the data assigned to that RTI is assigned to the node of interest in the active tree display in tree window 80. The Open Path button 101 also provides the administrator with a default feature, its selection at any time by the administrator will cause the display to default back to the root of the active tree.

PRUNING

Referring to the command window in FIG. 3, a "Minimize" button 103 supports, upon activation by point and click of mouse 49, a pruning operation on subtrees which will minimize switch storage requirements by allowing the operator to collapse all children into their parent node provided the children are all identical in terms of the hierarchical information that is imbedded in the tree to save memory and to reduce digit analysis time, applying this principle recursively from the bottom up. Equivalent call processing for a given subtree can be obtained by making the replacement and handling all exceptions with markers over to an RDIT which handles the digit analysis linearly.

FILE INPUT

File input is specified as a command-line parameter. In the preferred embodiment, files are ASCII with attributes separated by pipe signs (|).

As shown in FIG. 3, to supplement file input, the Open Path and Close Path buttons, 101 and 102 respectively, and the keypad 99 support manual input. Application of the Open Path button 101 enables keypad input for the tree under consideration. The keypad 99 allows navigation down the tree through existing nodes. A digit entered from the keypad which does not correspond to an existing node results in a node being created and appended to the tree. Application of the Close Path button 102 activates the Existing RTIs window 88 which permits selection of an existing RTI through point and click of mouse 49 such that the call connection data set 32 for the existing RTI is associated with the node at the end of the path, the Current Node 63. The selection of an RTI will overwrite existing associated data for the Current Node 63.

FILE OUTPUT

The names and locations of the files created by the commands Mask NXXs 94, Map RTIs 95, and Make RCs 96 are user definable parameters specified either at initial invocation of the GUI 50 or inherited as parameters as part of the execution environment.

Application of the "Make RC's" button 96 will write the current tree to a temporary file defined by the administrator. By permitting the administrator to define the output file, the administrator is able to identify output in a useful manner. For example, by naming the file "RC110494", the administrator is able to visually determine from the file name that it represents the Recent Changes made Nov. 4, 1994.

The temporary file will be sorted and compared to a sorted version of the input file. Differences will be written to the defined output file as a list of Recent Changes in a format suitable for downloading into each of the served switch databases.

The various features and functions of the present invention can be better understood through an explanation of typical operations which can be carried out using the OSS to maintain digit analysis trees and their embedded call connection information. First, examples for deleting, copying and pasting a leaf will be described, then a more ambitious operation, an NPA split, will be presented. In presenting the examples, an LDIT tree is the tree species under consideration, however, similar operations can be performed by the OSS on all other species of trees, that is, RDIT, PDIT, and INDIT trees.

OPERATIONAL EXAMPLES

I. Deleting a leaf—Assume that a subscriber is moving and requires a new number be assigned to his/her terminal equipment, consequently an LDIT tree is the tree species of interest.

This maintenance operation can be accomplished by dealing with only a single subtree. The maintenance operation is commenced by the administrator using mouse 49 to point and click on the Tree 1 button 97. At the GUI 50 initial display in tree window 80, ten circles are displayed on the first row of the tree, representing the ten roots of the trees in the LDIT forest. Because this is an LDIT tree, the 0 and 1 circles are not filled in, meaning they are ghost nodes which have not been created.

Assume the number 513-293-8426 is to be deleted. The administrator can proceed in two fashions.

Using one approach, the administrator uses the mouse 49 to point and click on the "5" in the line of circles in the Tree Window 80. This will display the "5" circle as the Current Node 63 in the first row while beneath it in the second row will be ten circles with the "0" and "1" filled in, the rest being ghosts consistent with the numbering plan adopted in NorthAmerica. Edges run from the filled-in circles in the second row to the "5" circle on the first row, the Current Node 63. Ten circles representing both existing nodes and nodes which could potentially be created but have not, referred to as ghost nodes, will always appear in the second row but only those circles for which there is data in teamed computer memory 44 will be filled in with a selectable number. Hence navigation by the OSS 40 in the tree is data driven rather than controlled by internal logic which might otherwise require subsequent maintenance itself. Next, the administrator points and clicks the mouse 49 on the "1" circle in the second row which causes the display to shift, now showing the "5" and "1" circles in the first row, the "1" circle now becoming the Current Node 63, and the ten children of the "1" circle on the second row, with edges running from the children to the parent, the "1" circle. The administrator then points and clicks on the "3" circle in the second row which then causes the display to shift, now showing the "5", "1" and "3" circles on the first row, the Current Node 63 now being the "3" circle, and the ten circles representing the existing and ghost children of the "3" circle in the second row. This point and click operation continues down through the appropriate nodes until the digit sequence of circles in the first row are 5-1-3-2-9-3-8-4-2 and the ten circles representing the existing and ghost children of the "2" circle appear in the second row. In the instant example, the "6" circle in the second row should be filled in, otherwise, a ghost "6" circle would indicate that the number has not been assigned and hence could not be deleted.

As mentioned, this point and click approach to dropping down along the tree one level at a time is not the only approach of the instant invention. The other approach the administrator can use is to key in the dial sequence on the keypad 99 and the appropriate subtree will be displayed to the extent of the last number keyed appearing on the far right in the line of circles in the first row as the Current Node 63 and its ten children in the second row.

Figure 6:
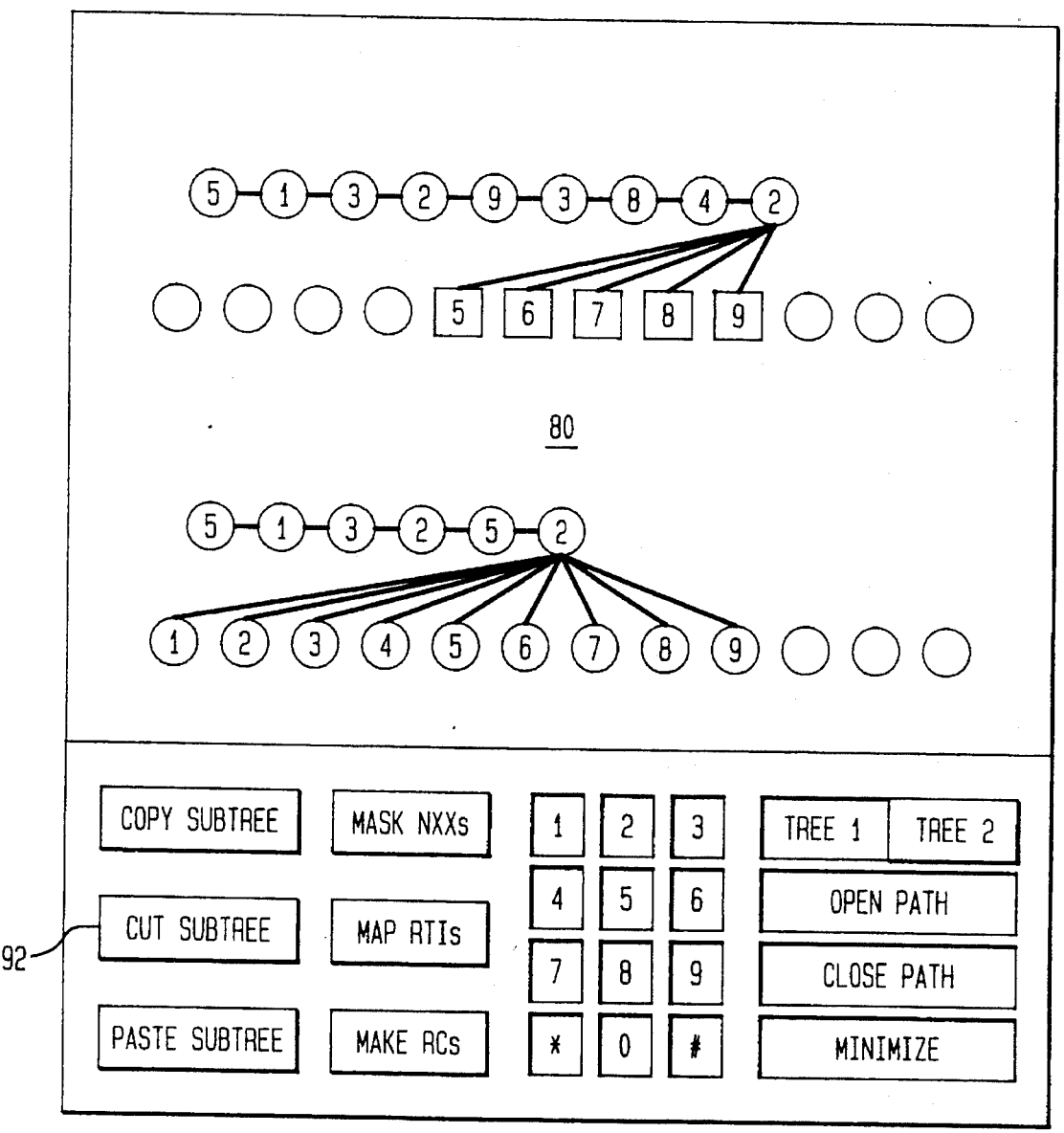
FIG. 6 illustrates a screen display of the instant invention in which the leaf, 513-293-8426 has been added to the subtree 513-293-842_.

By either approach, when the administrator arrives at the destination at which maintenance will be performed, the top row will have 5-1-3-2-9-3-8-4-2 circles in the first row and ten children, both existing and ghost, in the second row, connected by lines back to their parent, the "2" circle, as shown in FIG. 6. While not essential to the practice of the instant invention, symbols other than circles can be produced at any level of tree branches to aid in the administrator's visualization of the tree. For example, in the preferred embodiment of the instant invention, any node in the first row which has children is represented by a circle while any node in the first row which does not have children is represented as a square. Similarly, in the second row, any node which has children is represented as a triangle and any node which is a termination node, a leaf, is represented by a square. This permits the administrator to quickly assess the foliage at any level of the tree branches. For the sake of simplicity, in this discussion, all nodes are addressed as circles.

Figure 7:
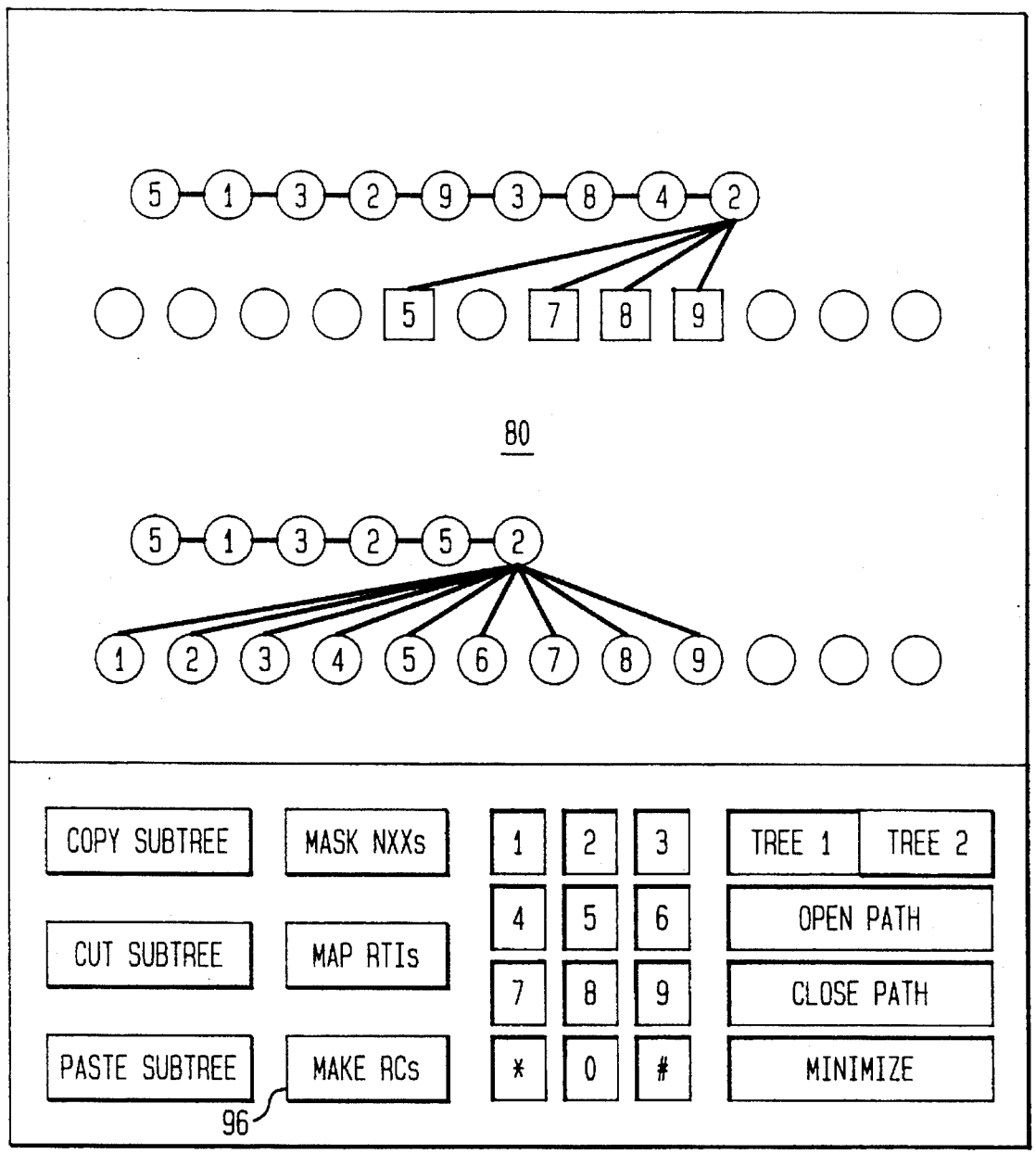
FIG. 7 illustrates a screen display in which an NPA split is initiated in which the 201 area code is split between 201 and a new area code 908.
Figure 8:
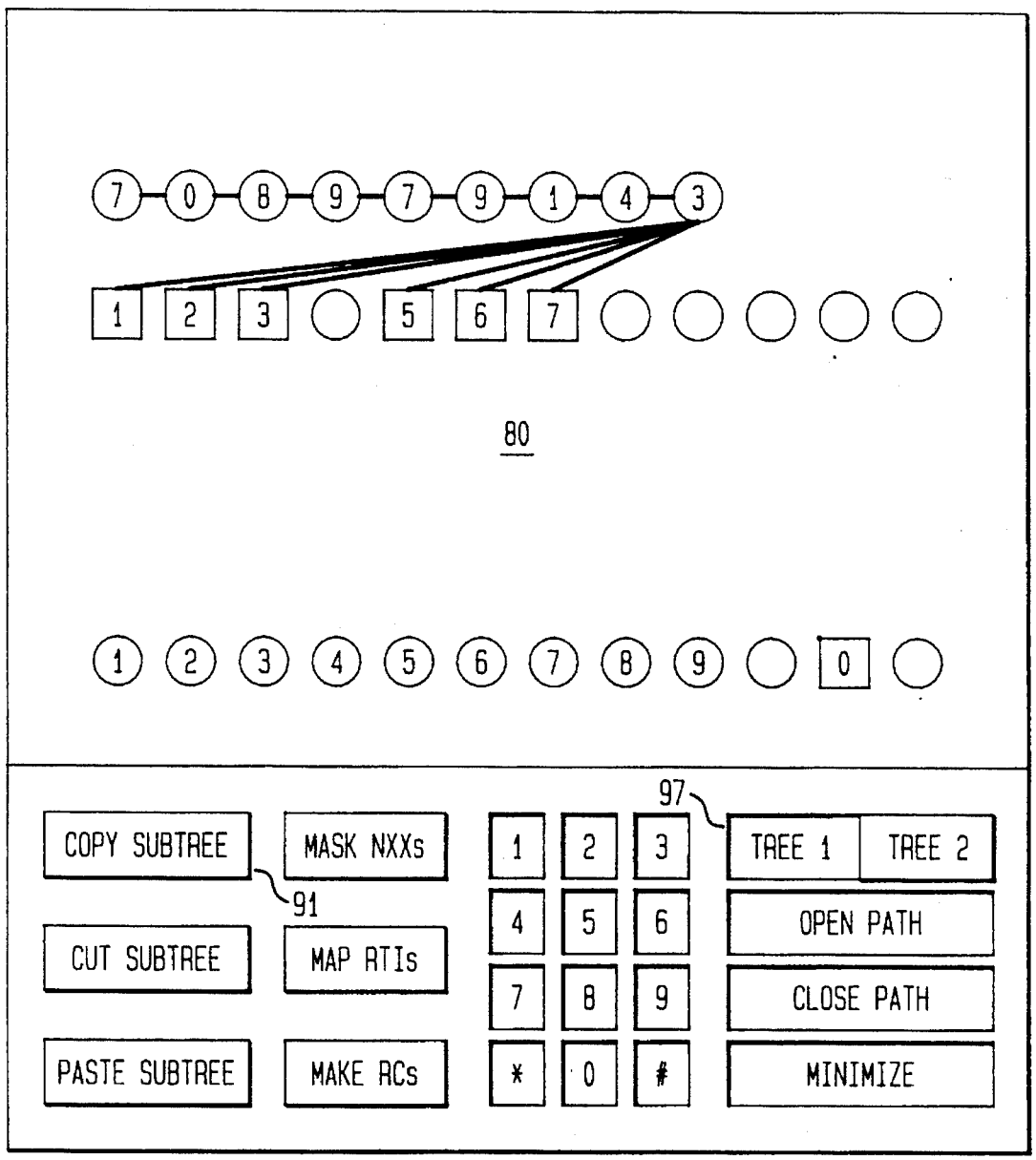
FIG. 8 illustrates a screen display in which the NXX numbers 221–247, which are not to be served through the 908 subtree, are masked so that the 908 subtree will not contain branches for these NXX numbers.

When the administrator has arranged for all active nodes on the subtree of interest to appear in the first row for the number under consideration, the administrator then moves to the second row and points and clicks with the mouse 49 on the "6" circle indicating that the next operation is to affect that node and causes that node to become the Current Node 63. The administrator then points and clicks on the Cut Subtree button 92 which blows the "6" circle out and the display reflects this by returning to the earlier display having 5-1-3-2-9-3-8-4-2 in the first row and the ten children of the "2" circle displayed in the second row with the "6" circle reflected as a ghost node as shown in FIG. 7. The administrator next points and clicks on the Make RC's button 96 which creates a database transaction that is sent to the served switches 12 and updates the memory 44 in the OSS 40 and the databases 20 in switches 12.

Once the leaf is deleted, a subsequent telephone call to the number will result in the last digit falling off the LDIT tree which generates a default behavior at the switch, usually an announcement given to the caller.

Figure 9:
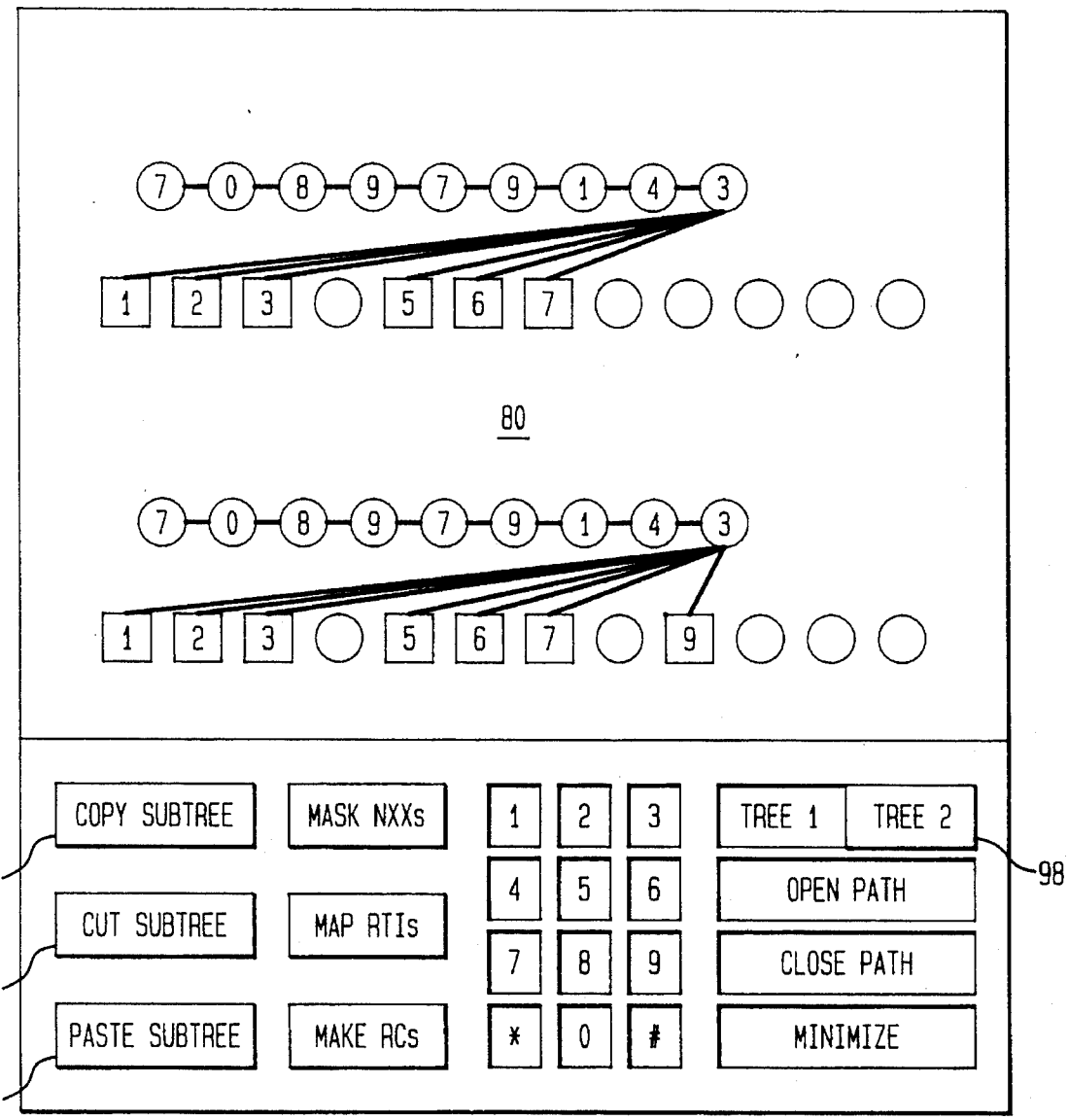
FIG. 9 illustrates the tabular arrangement of Routing Table Information (RTIs) which exist in the telecommunications system and a mapping table which permits routing information attributes to be assigned to the new 908 area code routing table

II. Adding a New Number—Assume that the administrator is notified of a new subscriber and wishes to add as that subscriber's number 708-979-1439. In this operation, the administrator starts by selecting a subtree which the administrator determines has sufficient attributes to assist in creation of the new number, in this case, the administrator selects 708-979-1437. By entry through the keypad 99 using mouse 49, the administrator calls from database memory 44 the subtree for the latter number which is displayed on the monitor as either a single row of circles 7-0-8-9-7-9-1-4-3-7 or as two rows with the first row consisting of 7-0-8-9-7-9-1-4-3 and the ten children of the "3" circle appearing in the second row. In either display mode, the administrator points and clicks mouse 49 on the "7" circle which is a child of 3 causing it to become the Current Node 63 and points and clicks on the Copy Subtree button 91 which pulls all data for the subtree into the paste buffer 45. Next the administrator selects the Tree 2 button 98 which signals to the OSS 40 that maintenance operations are disabled on the first subtree, the upper tree on the display in tree window 80, and all subsequent operations are to apply to the second tree, the lower tree in tree window 80. The administrator again navigates by mouse 49 pointing and clicking on either nodes 62 or keypad 99 to display the subtree 7-0-8-9-7-9-1-4-3 in the first row and to display the children of the "3" circle in the second row. The administrator then points and clicks on the Paste Subtree button 93 and points and clicks on the ghost "9" circle in the second row. This operation pulls all digit analysis specification data earlier placed in the paste buffer 45 for the number 708-979-1437 and applies it to the number 708-979-1439, which is now shown as an active node in the Tree 2 display, as shown in FIG. 9.

The effect of this is much more far reaching than what is displayed at the workstation because, while it appears that nothing follows the last digit, the last digit has associated with it the routing set for the number comprising a route index (an RTI), a code index and a charge index. Each is called an index because it is an index into a table of associated data. All the different parameters together are called a routing set. Copying the subtree also copies the routing set to the new number. Thus, the administrator need not separately enter the routing set for the new number, resulting in a savings in time and a conservation of operations.

Routing indexes are not the only information encoded into the trees. Structural idiosyncracies to support special access are also embedded, examples of which are "0+", "1+", "0-", "SAC" and "Competitive Access". 0+ is for operator assisted calls which are credit card and collect calls. 1+ is for direct dial long distance; 0- is for direct access to the operator. Competitive Access includes things like 1-0+ATT, which allows a caller to specify AT&T as his carrier, and also for presubscribed carriers. SAC is 411, 611, 911, and 811 and also 1-800, 1-500, and 1-700 access. All of these are special dialing idiosyncracies encoded in each tree.

Likewise, there are features such as Private Facility Access (PFA) and Customer Station Rearrangement (CSR) which allow a customer-side administrator to customize billing and routing arrangements with a centrex plan.

Further, number assignment reflects the existence of PBX and Centrex 1000's and 100's blocks of numbers which are administered at the level of the last four or last three digits by the customer-side administrator. To conserve memory, PBX and Centrex blocks are treated by the instant invention as terminating leaves at the penetrating digit. By penetrating digit is meant the first number in the block, so for example if the block is 1000–1999, the number 1 is the penetrating digit and encoded into the tree at that node is a pointer or address to a separate table which deals with those numbers within the block.

The copying of a subtree involves not only copying of data but also copying of hierarchical information that is encoded in the structure of the trees. The advantage is that this hierarchical information need not be input piece by piece, the copying of an old subtree to create the basis for a new subtree or tree carries over the hierarchical information as well while the OSS 40 permits that information to be subsequently customized to match the desired design for the new subtree. This is better explained in the following example.

III. NPA Split—The North American telecommunications system is rapidly running out of numbers within some area codes, yet the market continues to grow. To avoid this, a new area code can be created with ease and facility using the OSS 40, the new number taking over a portion of the numbers from the existing area code and, between the new and old area codes, creating additional number availability for the subscribers.

Assume 703 is the old area code which is becoming overloaded and 804 is the new NPA number to be created to unburden the existing old area code. Each is to take half of the existing numbers served. This is accomplished by moving half the 703 numbers to the 804 tree so that each tree will be only half filled. The granularity of the movement is individual NXX's. Each NXX number has associated with it the 10,000 seven-digit numbers which begin with that NXX. Before proceeding with the example, it is noted that in application, as a transitional measure, the administrator must allow both NPAs to support a common set of numbers for a period of time as the subscriber base becomes used to the new area code.

Figure 10:
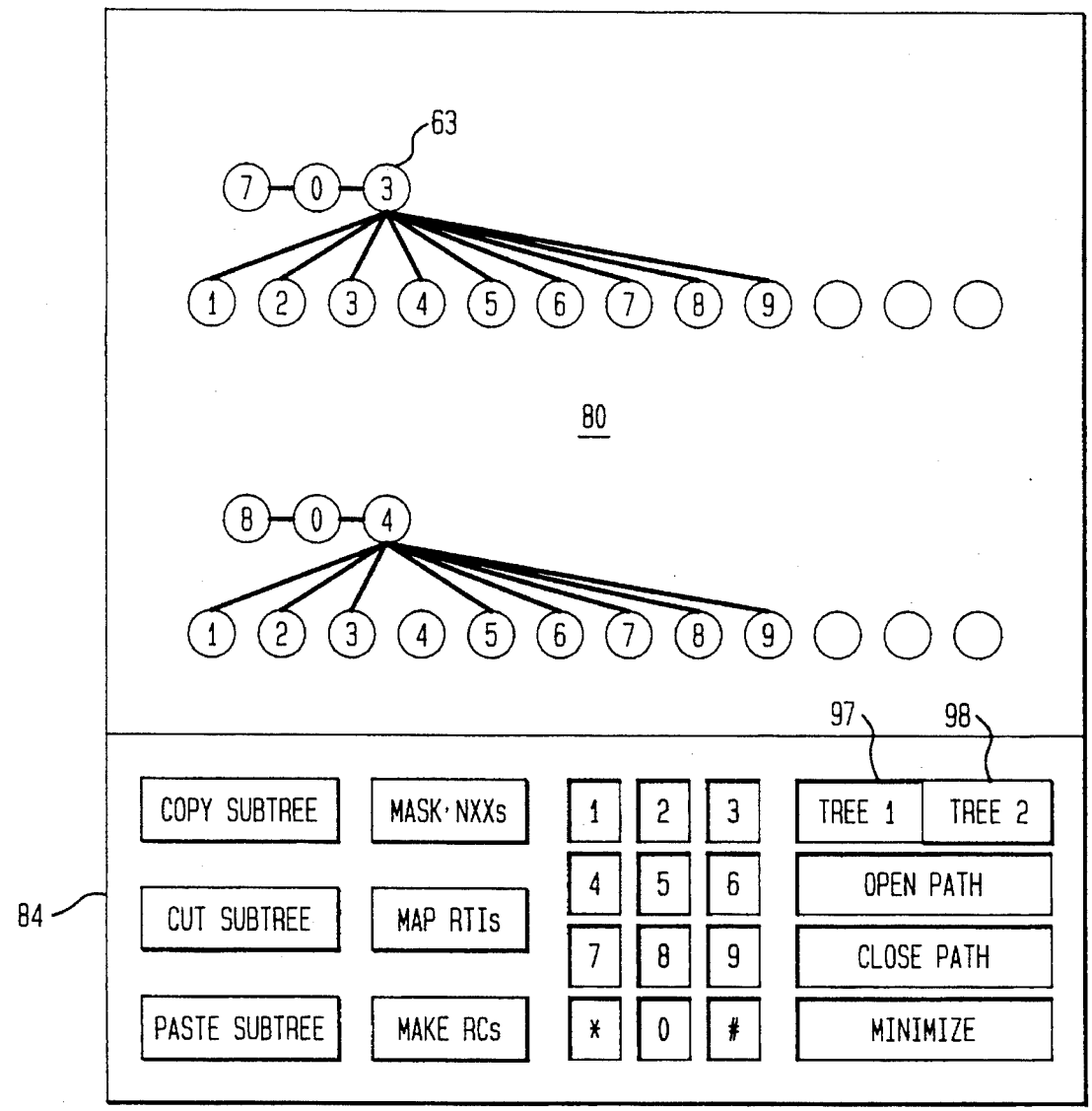
FIG. 10 illustrates use of the instant invention in performing an NPA split, showing that the new area code 703, called the NPA number, is created by displaying the subtree for the existing NPA number 804 simultaneously with the proposed subtree for the new NPA number 703.

Proceeding with the operations involved in an NPA split, the administrator presses the Tree 1 button 97 causing a row of twelve circles to appear of which eight are filled and four are ghosts, namely the "0", "1", "*" and "#" circles. The administrator selects the "7" circle on the first line by pointing and clicking on it with the mouse 49 which causes the display to shift to produce just the "7" circle in the first row as the Current Node 63 and its ten children in the second row, of which only the "0" and "1" circles are filled and the others are ghosts consistent with the North American dialing plan. The administrator points and clicks with mouse 49 on the "0" circle which causes the display to shift to produce the "7" and "0" circles in the first row with the "0" circle as the Current Node 63, and the twelve children of 0 in the second row, of which all are filled except the "0", "1", "*" and "#" which are ghosts. The administrator points and clicks on the "3" circle producing the 7-0-3 sequence of circles in the first row and activates the 3 node as the Current Node 63 by doing so, as shown in FIG. 10. The administrator points and clicks on the Copy Subtree button 91 which places all the information for the subtree through the Current Node 63 in the paste buffer 45 including all the associated idiosyncracies, structural irregularities and hierarchical information embedded in the subtree. The administrator then points and clicks on the Tree 2 button 98 to disable further operations on the 7-0-3 subtree and navigates down a new subtree through keypad entry or node selection with mouse 49 to produce an 8-0-4 sequence of circles on the first row or first and second row of the second subtree as described above in relation to the add number example. The "4" circle will be a ghost since this is an area code to be created by the administrator.

Figure 11:
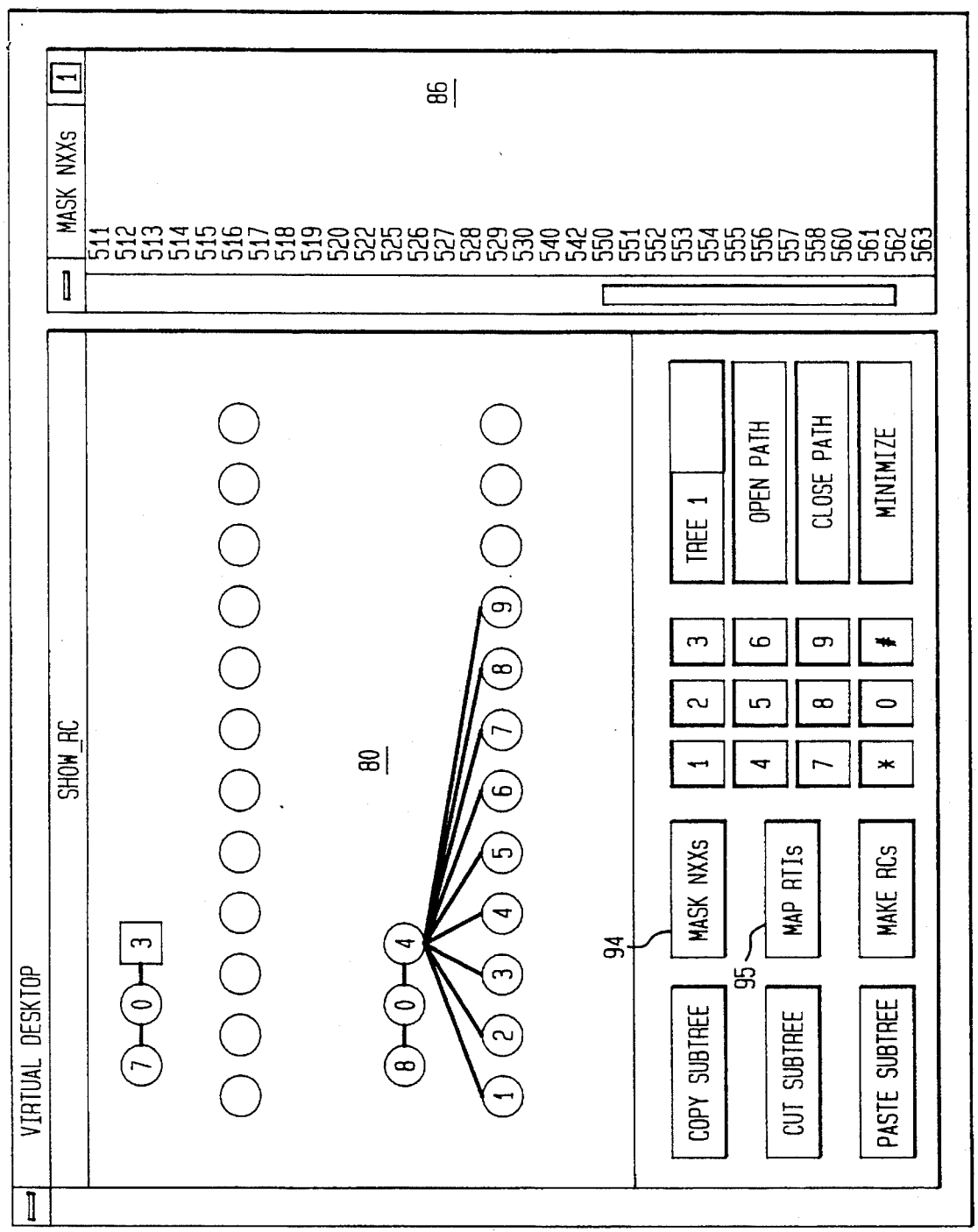
FIG. 11 illustrates, as part of the creation of the new area code 703, displaying of the NXX numbers then in the paste buffer by pressing the Mask NXXs button as a precursor to editing NXX numbers for the new area code.
Figure 12:
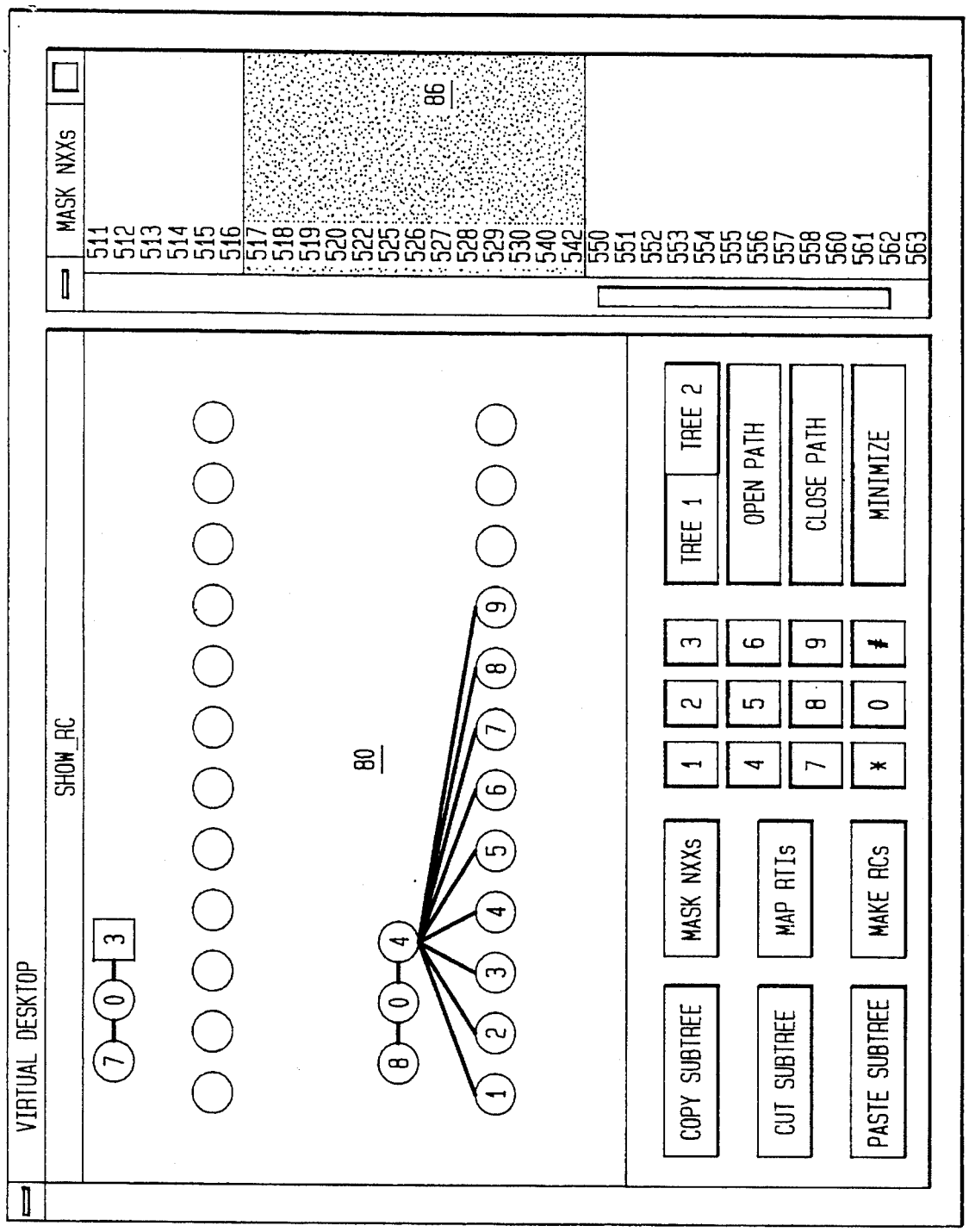
FIG. 12 illustrates, as part of the creation of the new area code 703, marking of the NXX numbers from 517 to 542 as part of editing certain NXX numbers from the new area code.

As shown in FIG. 11, the administrator then presses the Mask NXXs button 94 which causes the OSS 40 to identify and recover all NXXs currently in the paste buffer 45 for the 703 area code. The NXX numbers are part of the structural information embedded in the tree and hence resident in the paste buffer 45. The recovered NXXs are listed numerically in Mask NXXs window 86. As shown in FIG. 12, using the mouse 49, the administrator scrolls up and down the list and marks blocks of NXXs to be masked from the new area code by clicking once on the left mouse button to signal an edit, again depressing and holding the left button to commence a mark and releasing the left button when the end of the NXX numbers to be marked is reached. Once marked, the numbers will be displayed in reverse color contrast. The administrator then clicks the middle button of the mouse and a pop-up menu, not shown, is displayed allowing the administrator to select cut or paste operations. The administrator selects "cut" by pointing an clicking with the mouse 49 on the cut command and that information related to the marked NXXs is deleted from the paste buffer 45.

The administrator next points and clicks on the Map RTIs button 95 which closes the Mask NXXs window 86 which causes the edited NXX file to be stored in an edit file for further editing if need be. As an aside, each time the Mask NXXs file is retrieved and returned to the edit file it replaces the prior version of the list with the just edited list.

Figure 13:
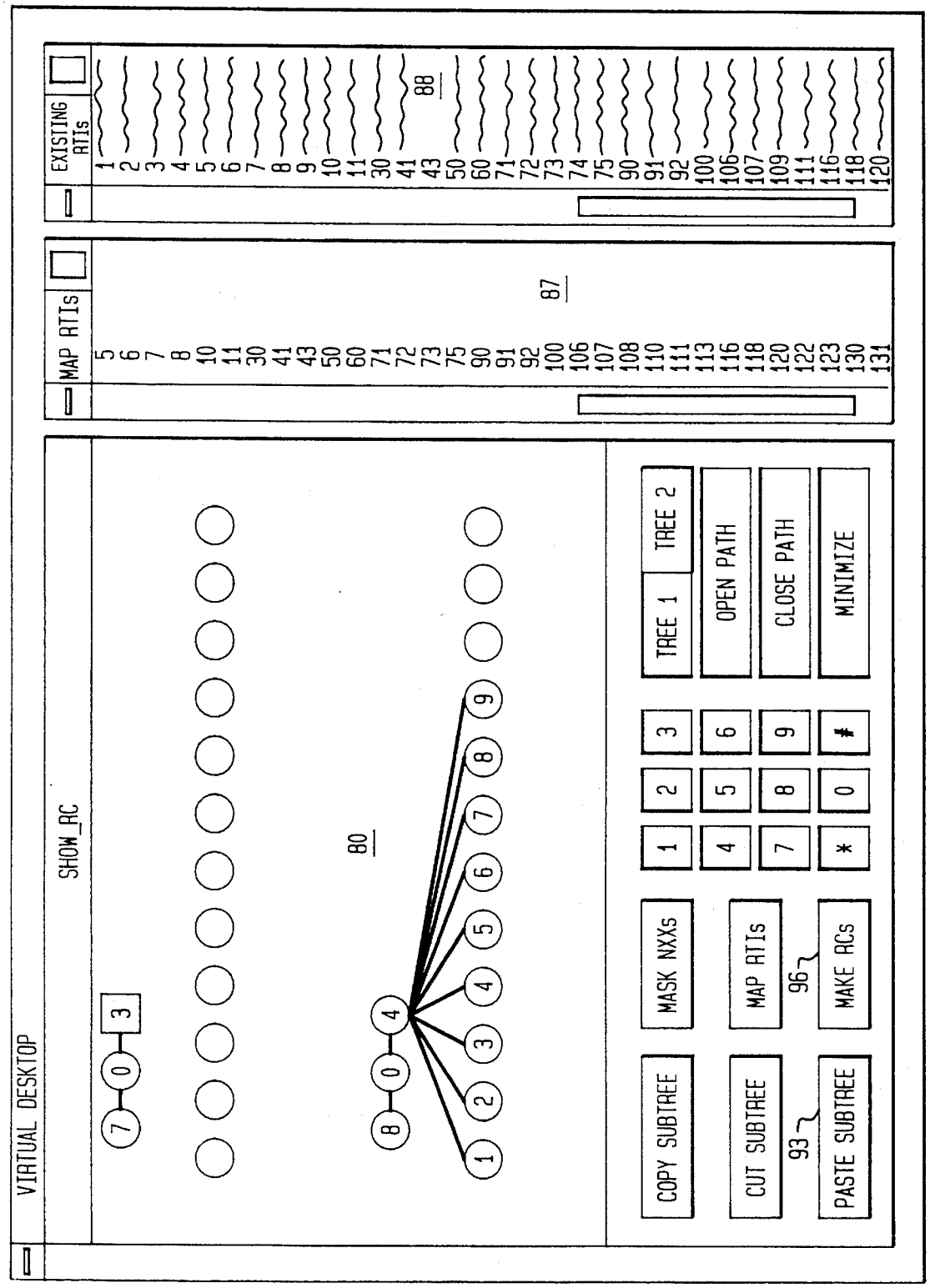
FIG. 13 illustrates displaying both a Map RTIs window 87 and an existing RTIs window 88 along the right side of tree window 80 to permit assignment of attributes from existing RTIs to RTIs for the newly created area code 703.

As shown in FIG. 13, activating the Map RTIs button 95 causes two windows to appear adjacent the right side of the tree window 80 in which the subtrees are displayed, the nearer is the Map RTIs window 87 and the farther is the Existing RTIs window 88. The Map RTIs window 87 displays a list of each distinct RTI that has been referenced in the paste buffer 45. The Existing RTIs window 88 displays a list of each RTI possible at the switch. The administrator is able to scroll up or down either list independently. To assign the attributes of the routing set represented by an existing RTI to one of the RTIs for the newly created area code, the administrator parallels the steps in masking NXXs, pressing the left mouse button to signal an edit, depressing and holding the left mouse button on one or more of the existing RTIs to mark one or more, releasing the mouse button on the last RTI to be marked, and depressing the middle mouse button to cause a menu to be displayed having a cut or paste option from which the "cut" option is selected by point and click of the mouse 49 on the cut command which results in the marked existing RTIs being copied to the mouse edit buffer. The administrator then points and clicks on the first of the RTI numbers to which the existing RTI attributes are to be assigned and then points and clicks on the past command in the pop-up window. The result is the assignment to each of those RTI numbers in the Map RTIs window 87 the attributes of one of the existing RTIs earlier marked and placed in the mouse edit buffer. An existing RTI can be mapped to more than one of the RTI numbers appearing in the Map RTIs window but no more than one existing RTI can be assigned to any single RTI number.

Once the administrator is satisfied with the status of the information changes, the administrator points and clicks on the Paste Subtree button 93 with mouse 49, then moves the mouse 49 to the desired ghost node, in our example the "4" circle, and clicks on the node. This causes the paste buffer's 45 information to be updated by the change identified in the mouse edit buffer thereby inserting the indexes which now reflect the customized call connection data sets 32 routing and charging information into the "4" circle node.

Selecting the "Make RCs" button 96, by point and click of mouse 49, the administrator causes the OSS 40 to send the updated information in the paste buffer 45 to memory 44 and to each switch database 20 as Recent Changes.

It is to be understood that the above description is only of one preferred embodiment of the invention. Numerous other arrangements may be devised by one skilled in the art without departing from the scope of the invention. As an example, navigation and command can as easily be achieved through a touch screen rather than through a mouse. Likewise, symbols to reflect the nature of a node as a branch or a leaf could be supplanted or supplemented by different color nodes. The invention is thus limited only as defined in the accompanying claims.

We claim:

1. An apparatus for manipulating and examining digit analysis specifications, including routing table indexes, routing table references, serving switch information, coding information and charging information, associated with dialed digit nodes, that supports digit analysis in telecommunications call processing through stored program switches comprising:

means for displaying a dialed digit node of interest, the nodes representing the lineage of the node of interest, and the nodes representing the children of the node of interest visually as a subtree consisting of symbols representing the nodes; and means for transferring the digit analysis specifications associated with one displayed node to another displayed node in the absence of display of the digit analysis specifications associated with either node.

2. The apparatus of claim 1, which further includes:

means for displaying at least two subtrees simultaneously.

3. The apparatus of claim 2, wherein the means for transferring digit analysis specifications associated with one displayed node to another displayed node includes means for transferring from a node on one displayed subtree to a node on another displayed subtree.

4. The apparatus of claim 3, wherein the digit analysis specifications associated with a displayed node include the digit analysis specifications for each descendant of the displayed node.

5. The apparatus of claim 4, wherein the transfer means, in transferring in digit analysis specifications to a node, which has associated with it digit analysis specifications, leaves intact a digit analysis specification in the absence of a conflicting digit analysis specification being transferred in and replaces a digit analysis specification in the presence of a conflicting digit analysis specification being transferred in.

6. The apparatus of claim 5, which further includes:

for a switch, existing routing table indexes independent from digit analysis specifications; and means for storing and accessing the existing routing table indexes.

7. The apparatus of claim 6, which further includes:

means for storing digit analysis specifications for switches independent from the switches themselves;

means for retrieving digit analysis specifications from storage; and means for updating digit analysis specifications in the independent storage means and in the switches themselves.

8. The apparatus of claim 7, wherein the transfer means includes:

buffer means for storing copies of digit analysis specifications;

means for selecting a displayed subtree of interest;

means for selecting a node of interest in the subtree of interest;

means for selecting an operation on the node of interest wherein operations include "cut" which results in the corresponding digit analysis specifications for the node and its descendants to be deleted from the digit analysis specifications for the subtree; "copy" which results in a copy of the corresponding digit analysis specifications for the node and its descendants to be stored in the buffer means; and "paste" which results in digit analysis specifications stored in the buffer means to be associated with a selected node of interest and its descendants.

9. The apparatus of claim 8, which further comprises:

means for editing digit analysis specifications associated with a node of interest.

10. The apparatus of claim 9, wherein the means for editing digit analysis specifications includes:

means for identifying all exchanges for which a switch is the serving switch for calls terminating within the exchanges associated with a node of interest, each exchange represented by a number called an NXX;

means for displaying all NXXs for identified exchanges;

means for selectively deleting NXXs from the identified NXXs; and means for associating the remaining NXXs with the node of interest.

11. The apparatus of claim 10, wherein the means for editing digit analysis specifications includes:

means for identifying all routing table index references for a node of interest;

means for displaying all identified routing table index references;

means for retrieving all existing table indexes for a switch;

means for displaying retrieved existing routing table indexes contemporaneously with routing table index references for a node; and means for assigning a routing table index to one or more routing table index locations.

12. The apparatus of claim 11, further including:

means for comparing for a digit analysis tree, digit analysis specifications which existed before manipulation with digit analysis specifications which exist after manipulation to determine changes;

means for accumulating the changes; and means for providing the changes as updates to the updating means for updating digit analysis specifications in the independent storage means and in the switches.

13. Apparatus for administering digit analysis specification trees comprised of nodes and embedded call process information, including routing table indexes, routing table index references, coding indexes and charging indexes, for stored program electronic switches in a telecommunications system comprising:

a centralized computer including a central processing unit, memory and software which create databases, and store, retrieve, and update data in the databases;

digit analysis specification trees for each served switch resident in the centralized computer databases;

a workstation including a central processing unit, memory, display monitor and mouse;

means for displaying a subtree, that is, a node of interest, the lineage back from the node of interest to the root node of the digit analysis tree of which it is a part, and the children of the node of interest, as symbols;

means for manipulating the symbols which results in the addition, deletion, or change of the nodes and the embedded call process information; and means for providing the results of manipulating the symbols to the centralized computer for updating the databases.

14. The apparatus of claim 13, wherein each node is a dialed digit in a telephone number sequence and the means for displaying a subtree displays two subtrees contemporaneously, each subtree displayed as two rows of symbols, the first row displaying the symbol for the node of interest as the last symbol in a chain of symbols, each preceding symbol representing the preceding dialed digit in the telephone number back to the first digit, the root node, and the second row displaying the symbols for the children of the node of interest.

15. The apparatus of claim 14, which further includes means for selecting a subtree of interest;

means for selecting a node of interest on the subtree of interest;

the symbol for each node from the node of interest back to the root as a filled in circle; and the symbol for each node which is a child of the node of interest filled in if an active node and empty if a potential node.

16. The apparatus of claim 15, wherein the symbol for each node which is a child of the node of interest is a triangle when the node has children and is a square when the node is without children.

17. The apparatus of claim 16, which further includes:

means for selectively displaying, contemporaneously with the display of a subtree of interest, call process information embedded in the subtree of interest;

means for manipulating displayed call process information;

means for transferring manipulated call process information from one node of interest to another node of interest by identifying the node of interest to the transfer means.

18. The apparatus of claim 17, which further includes existing routing table indexes for the served switches and the means for manipulating call process information includes the contemporaneous display of routing table index references in the subtree with the display of existing routing table indexes for the served switches.

19. The apparatus of claim 18, for a telecommunications system utilizing the North American Dialing plan of ten digits of which the first three digits represent the area code and are called the NPA number; the second three digits represent the local exchange and are called the NXX number and the last four digits are the destination terminal number and are called the XXXX, wherein the means for manipulating call process information includes, contemporaneous with the display of a node of interest which represents the last dialed digit of an NPA number, the display of active NXX numbers which are descendants of the NPA.

20. A computer-based method of providing enhanced manipulation and examination of digit analysis specification trees, including embedded call process information including routing table reference locations, routing table indexes, served local exchange information, coding information and charging information, associated with dialed digit nodes, that supports digit analysis in telecommunications call processing through stored program electronic switches, comprising the steps of:

(a) creating databases in computer memory;

(b) storing digit analysis specification trees in created databases;

(c) selecting for a stored digit analysis specification tree a subtree of dialed digit nodes of interest;

(d) recovering from memory the subtree and all descendants of the subtree including the embedded call process information;

(e) displaying dialed digit nodes as symbols, using different symbols to indicate the nature of a node as active or potential and as having children or being a terminating node;

(f) displaying the selected subtree of interest as a chain of symbols representing the nodes from the root of the digit analysis specification tree along the path of the branches of the subtree to the node of interest and a series of symbols representing the children of the node of interest, both active and potential;

(g) selecting a node of interest to manipulate;

(h) manipulating the node of interest by commands;

(i) comparing the subtree condition prior to manipulation with the subtree condition subsequent to manipulation to identify the changes in the nature of the nodes and the embedded call process information; and (j) updating the digit analysis specification tree in the computer databases using the changes.

21. The method of claim 20, wherein the symbols are selected from the group consisting of circles, squares and triangles.

22. The method of claim 21, including the additional steps of:

displaying two subtrees of interest contemporaneously; and selecting one subtree at a time as active whereby subsequent commands manipulate the selected node of interest in the active subtree.

23. The method of claim 22, wherein manipulating node commands are selected from the group consisting of "cut", "copy" and "paste".

24. The method of claim 23, in which selecting the node command "cut" includes the additional steps of:

changing the nature of the node of interest from active to potential;

deleting the corresponding digit analysis specifications for the node of interest and its descendants from the digit analysis specifications for the subtree; and displaying the subtree with the node of interest displayed as a potential node.

25. The method of claim 24, in which selecting the node command "copy" includes the additional step of:

temporarily storing the corresponding digit analysis specifications for the node of interest and its descendants.

26. The method of claim 25, in which selecting the node command "paste" includes the additional steps of:

retrieving digit analysis specifications temporarily stored;

associating the retrieved digit analysis specifications with the selected node of interest and its descendants; and displaying the subtree with the symbols for children of the node of interest displayed to reflect the nature of the children consistent with the associated digit analysis specifications.

27. The method of claim 26, in which selecting the node command "copy" for a node having associated digit analysis specifications includes the additional steps of:

deleting each associated digit analysis specification for which there is a corresponding digit analysis specification to be associated with the selected node; and retaining remaining associated digit analysis specifications as associated with the node.

28. The method of claim 27, which includes the additional step of changing the node of interest selected for manipulation.

29. The method of claim 28, wherein manipulating the nodes includes the additional steps of:

displaying a list of numbers, each number in the list representing served local exchange information associated with the node of interest;

marking numbers in the list corresponding to served local exchange information to be deleted; and deleting marked numbers whereby the served local exchange information represented by the number is also deleted.

30. The method of claim 29, wherein manipulating the nodes includes the additional steps of:

displaying embedded call process information; and selectively manipulating embedded call process information displayed.

31. The method of claim 30, wherein manipulating the nodes includes the additional steps of:

storing existing routing table information for switches in created databases;

displaying available reference locations for routing table indexes in the subtree of interest;

retrieving existing routing table information for a switch form the created databases;

displaying retrieved existing routing table information;

selectively assigning existing routing table information to routing table information reference locations in the subtree.

* * * * *